(12) United States Patent
Lee

(10) Patent No.: US 10,060,590 B2
(45) Date of Patent: Aug. 28, 2018

(54) LIGHT RING STRUCTURE FOR VEHICLE LAMP

(71) Applicant: FU AN INDUSTRIAL CO., LTD., Tainan (TW)

(72) Inventor: Jihn-Shiun Lee, Tainan (TW)

(73) Assignee: Fu An Industrial Co., Ltd., Tainan (TW)

( * ) Notice: Subject to any disclaimer, the term of this patent is extended or adjusted under 35 U.S.C. 154(b) by 415 days.

(21) Appl. No.: 14/874,812

(22) Filed: Oct. 5, 2015

(65) Prior Publication Data
US 2017/0097133 A1    Apr. 6, 2017

(51) Int. Cl.
| | |
|---|---|
| *F21V 9/00* | (2018.01) |
| *F21V 7/04* | (2006.01) |
| *G02B 6/00* | (2006.01) |
| *G09F 13/00* | (2006.01) |
| *H01L 33/00* | (2010.01) |
| *F21S 43/237* | (2018.01) |

(Continued)

(52) U.S. Cl.
CPC ............ *F21S 43/237* (2018.01); *F21S 41/24* (2018.01); *F21S 43/241* (2018.01); *F21S 43/245* (2018.01); *F21S 43/247* (2018.01); *G02B 6/001* (2013.01)

(58) Field of Classification Search
CPC .. F21S 48/225; F21S 48/1241; F21S 48/2268; F21S 48/2287; F21S 43/241; F21S 43/236; F21S 43/247; F21S 43/245; F21S 43/237; F21S 41/24; G02B 6/001; G02B 6/0038; G02B 6/0006; G02B 6/0015; G02B 6/0028; G02B 6/0005; F21V 5/005; F21V 5/02; F21V 5/002
See application file for complete search history.

(56) References Cited

U.S. PATENT DOCUMENTS

| | | | | |
|---|---|---|---|---|
| 5,432,876 A | * | 7/1995 | Appeldorn | G02B 6/001 362/554 |
| 6,452,872 B1 | * | 9/2002 | Teijido | G02B 6/001 349/62 |

(Continued)

FOREIGN PATENT DOCUMENTS

| | | |
|---|---|---|
| TW | M334062 | 12/2007 |
| TW | M368568 U1 | 11/2009 |

(Continued)

*Primary Examiner* — Erin Kryukova
(74) *Attorney, Agent, or Firm* — Rosenberg, Klein & Lee

(57) ABSTRACT

This invention is related to an improved light ring structure for vehicle lamp. An incident portion is extended and projected from one side of a light-guiding ring, and a V-shaped light-guiding portion connects the incident portion and the light-guiding ring. An optical structure is formed on an optical surface of the light-guiding ring, and several teeth are aligned on the optical surface. One side of each tooth is a vertical section which faces to the incident portion and the other side of that is an inclined section. The width of the teeth is increased gradually from the incident portion and the opposite of the incident portion to the two sides of the light-guiding ring, forming the widest tooth at the two sides of the light-guiding ring, and the height of the teeth is increased gradually from the incident portion, forming the highest tooth at the opposite of the incident portion.

3 Claims, 5 Drawing Sheets

(51) Int. Cl.
*F21V 8/00* (2006.01)
*F21S 41/24* (2018.01)
*F21S 43/241* (2018.01)
*F21S 43/245* (2018.01)
*F21S 43/247* (2018.01)

(56) References Cited

U.S. PATENT DOCUMENTS

| | | | | |
|---|---|---|---|---|
| 6,874,921 | B2* | 4/2005 | Verlage | E05B 17/10 362/23.15 |
| 7,025,482 | B2* | 4/2006 | Yamashita | G02B 6/0018 362/348 |
| 7,712,907 | B2* | 5/2010 | Zyka | G02B 5/045 362/16 |
| 8,870,423 | B2* | 10/2014 | Mihara | F21S 48/1241 362/507 |
| 2003/0026106 | A1* | 2/2003 | Knaack | B60Q 1/0052 362/511 |
| 2003/0103418 | A1* | 6/2003 | Hirano | G04C 17/02 368/82 |
| 2004/0066659 | A1* | 4/2004 | Mezei | G02B 6/001 362/555 |
| 2005/0189545 | A1* | 9/2005 | Tazawa | B60Q 1/0011 257/79 |
| 2005/0276565 | A1* | 12/2005 | Bourdin | F21S 48/2237 385/146 |
| 2006/0039692 | A1* | 2/2006 | Lee | G02B 6/0038 396/198 |
| 2006/0209561 | A1* | 9/2006 | Tenmyo | G02B 6/001 362/602 |
| 2007/0159846 | A1* | 7/2007 | Nishiyama | G01D 11/28 362/602 |
| 2008/0002400 | A1* | 1/2008 | Huang | B60Q 1/0052 362/216 |
| 2008/0239721 | A1* | 10/2008 | Mezouari | G01D 11/28 362/253 |
| 2009/0316382 | A1* | 12/2009 | Birman | G01D 11/28 362/23.07 |
| 2010/0157619 | A1* | 6/2010 | Chinniah | G02B 6/001 362/551 |
| 2010/0254152 | A1* | 10/2010 | Taleb-Bendiab | B60Q 1/0035 362/551 |
| 2014/0056015 | A1* | 2/2014 | Martoch | F21S 48/2237 362/487 |
| 2015/0029741 | A1* | 1/2015 | Lee | G02B 6/0096 362/551 |
| 2016/0347234 | A1* | 12/2016 | Herbin | B60Q 1/0011 |

FOREIGN PATENT DOCUMENTS

TW M380255 U1 5/2010
TW M389054 U1 9/2010
TW M429616 U1 5/2012

* cited by examiner

LIGHT RING STRUCTURE FOR VEHICLE LAMP

BACKGROUND OF THE INVENTION

Field of the Invention

The present invention relates to an improved light ring structure for vehicle lamp. More particularly, the light emitted from a light source is emitted uniformly to keep high brightness and uniform color in the light ring structure for vehicle of the present invention.

Description of Related Art

All kinds of vehicle can shorten the time which is required for transporting people and all kinds of article between two places, further increasing convenience in daily life and transporting the all kinds of article, so people love to buy the vehicle to use. Therefore, all kinds of vehicle are seen in the entire roadway. In general vehicle, all kinds of lamps, such as headlight, side light, tail light, direction signal, brake light, are set at the different location for emitting different color lights under different status to remind the other drivers and pedestrian to pay attention to the location of approach vehicle or the traffic direction, meanwhile, the lamps illuminate the road condition to ensure the traffic safety when night driving, at dark or at poor visibly. However, for vehicle designer, the vehicle lamp is not only for illumination, it is also designed to fit the vehicle body line, so the vehicle designer often think hard to design the location of the distance light, fog light, direction signal, even the location of the side light, position light, recognition light.

Therefore, a light-guiding ring for setting on the vehicle is researched and developed by the manufacturer. The light-guiding ring promotes the function of warning and identification of the vehicle lamp, further increases the attraction. Please refer to the TW Patent application with the Issued No. M389054U1 on Sep. 21, 2010, "IMPROVED LED LIGHT RING FOR VEHICLE LAMP". The LED light ring comprises a PCB board set with several LEDs, and a light collection ring cover with light transmission property. However, the foregoing improved LED light ring for vehicle lamp requires high cost in entire structure manufacture and spends more electric energy in use due to the PCB board set with several LEDs.

Moreover, please refer to the TW Patent application with the Issued No. M429616U1 on May 21, 2012, "LIGHT RING FOR VEHICLE LAMP," and the TW Patent application with the Issued No. M334062 on Jun. 11, 2008, "LIGHT RING STRUCTURE FOR VEHICLE LAMP". According to the FIGURE shown in the foregoing two patent applications, the light ring for vehicle lamp in the Issued No. M429616U1 comprises several light-emitting modules. Each light-emitting module comprises at least one light-emitting element, and LEDs are set at the two ends of the circular light-emitting element. It causes that the light ring for vehicle lamp requires high cost in entire structure manufacture, and that the LEDs need to be hidden, so the light shape has notch and unable to form an entire circle. Furthermore, the effect of light guide is still poor, so the light cannot be evenly diffused. The light ring structure for vehicle lamp in the Issued No. M334062 comprises cold cathode fluorescent lamp, so it requires high cost in manufacture and spends more electric energy in use. Moreover, the conductive parts are set on the two ends of the cold cathode fluorescent lamp, likewise, the light shape at the conductive parts has notch and unable to form an entire circle.

Please refer to the TW Patent application with the Issued No. M368568U1 on Nov. 11, 2009, "LIGHT RING FOR AUTOMOBILE," which comprises a light-guiding ring made of optical material with well light-conductive property, and two L-shaped incident portions bended and extended from one end of the light-guiding ring, which incident portions have a free end to be an incident surface. A light source is set at the incident portions and is emitted into the light-guiding ring, and when the light in the light-guiding ring illuminates the notch, the notch refracts or reflects the light to produce brightened dot like the light emitted by a light-emitting element, such as a lamp bulb or a LED, achieving the better decorative effect. Or, several dots for refracting or reflecting the light are set at one side of the light-guiding ring, so that the light is conducted in the light-guiding ring and then the light is reflected by the dots to produce uniform illumination. However, the brightened dot like the light emitted by a lamp bulb or a LED is too harsh, and the effect of light guide of the light reflected by the dots is poor, so the light cannot be evenly diffused.

Accordingly, the TW Patent application with the Issued No. M380255U1 on May 11, 2010, "IMPROVED LIGHT RING STRUCTURE" is issued by the manufacturer. The improved light ring structure comprises a light-guiding ring, an incident portion extended from one side of the light-guiding ring and perpendicular to the central axis line of the light-guiding ring. The incident portion has a first end as the first incident surface and a second end opposite to the first end for integrally connecting with the light-guiding ring. A V-shaped opening is formed corresponding to the second end of the incident portion, and a light source illuminates the incident portion via the first incident surface, and the light emitted from the incident portion illuminates into the light-guiding ring via the second incident surface. However, in the foregoing improved light ring structure, the light illuminates the incident portion via the first incident surface to desire to decrease the quantity of the light source, and several notch for refracting or reflecting the light are set at one side of the periphery of the light-guiding ring, but the effect of light guide of the notch is still poor, resulting that the light cannot be evenly diffused. Therefore, the structure must still be improved.

SUMMARY OF THE INVENTION

Therefore, the object of the present invention is related to an improved light ring structure for vehicle lamp. An optical structure is formed on the optical surface of a light-guiding ring. With a vertical section of the teeth facing to an incident portion of the optical structure, the height of the teeth increased gradually from the incident portion, and the width of the teeth increased gradually from the incident portion and the opposite of the incident portion to the two sides of the light-guiding ring, the light emitted from a light source is refracted by the optical structure and then emitted from the light-emitting surface to keep high brightness and more uniform color.

For the above object, an improved light ring structure for vehicle lamp comprises a light-guiding ring, an incident portion, a V-shaped light-guiding portion and an optical structure. The light-guiding ring has a first side as an optical surface and a second side as a light-emitting surface. The incident portion is extended and projected from the optical surface, and the V-shaped light-guiding portion connects the incident portion and the light-guiding ring. The optical structure is formed on the optical surface, so that the light entering from the incident portion is guided bilaterally into the light-guiding ring through the V-shaped light-guiding portion and refracted by the optical structure to be emitted from the light-emitting surface of the light-guiding ring.

Several teeth are aligned on the optical surface of the light-guiding ring. One side of each tooth is a vertical section which faces to the incident portion of the light-guiding ring, and the other side of that is an inclined section. The width of the teeth is increased gradually from the incident portion and the opposite of the incident portion to the two sides of the light-guiding ring, forming the widest tooth at the two sides of the light-guiding ring, and the height of the teeth is increased gradually from the incident portion, forming the highest tooth at the opposite of the incident portion of the light-guiding ring.

According to the above description and embodiments, the improved light ring structure for vehicle lamp of the present invention has the advantages as following:

1. In the improved light ring structure for vehicle lamp of the present invention, the optical surface of the light-guiding ring comprises the optical structure. Since the vertical section of the teeth faces to the incident portion, the height of the teeth is increased gradually from the incident portion, and the width of the teeth is increased gradually from the incident portion and the opposite of the incident portion to the two sides of the light-guiding ring, the light emitted from the light source is guided to the optical structure for refraction, thereby emitting light with high brightness and uniform color from the light-emitting surface.

2. In the improved light ring structure for vehicle lamp of the present invention, the incident portion is extended and projected from the optical surface of the light-guiding ring, so the light emitting by only one led as the light source has high brightness and uniform color at the entire light-guiding ring, achieving the energy-saving effect and lower cost.

3. The light-guiding ring of the present invention is integrated, and the incident portion is extended and projected from one end of the optical surface of the light-guiding ring, so the light distribution pattern is a complete circle without notch.

DETAILED DESCRIPTION OF THE PREFERRED EMBODIMENT

Figure 1:
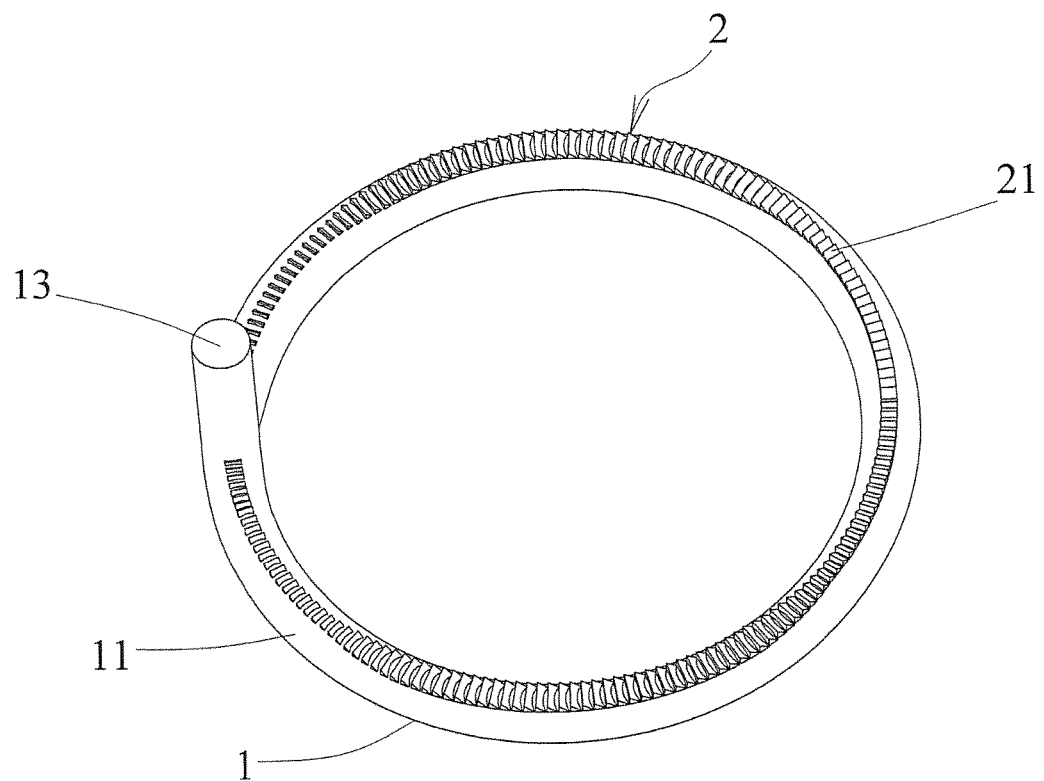
FIG. 1 is a three-dimensional view of an improved light ring structure for vehicle lamp according to an embodiment of the present invention.
Figure 2:
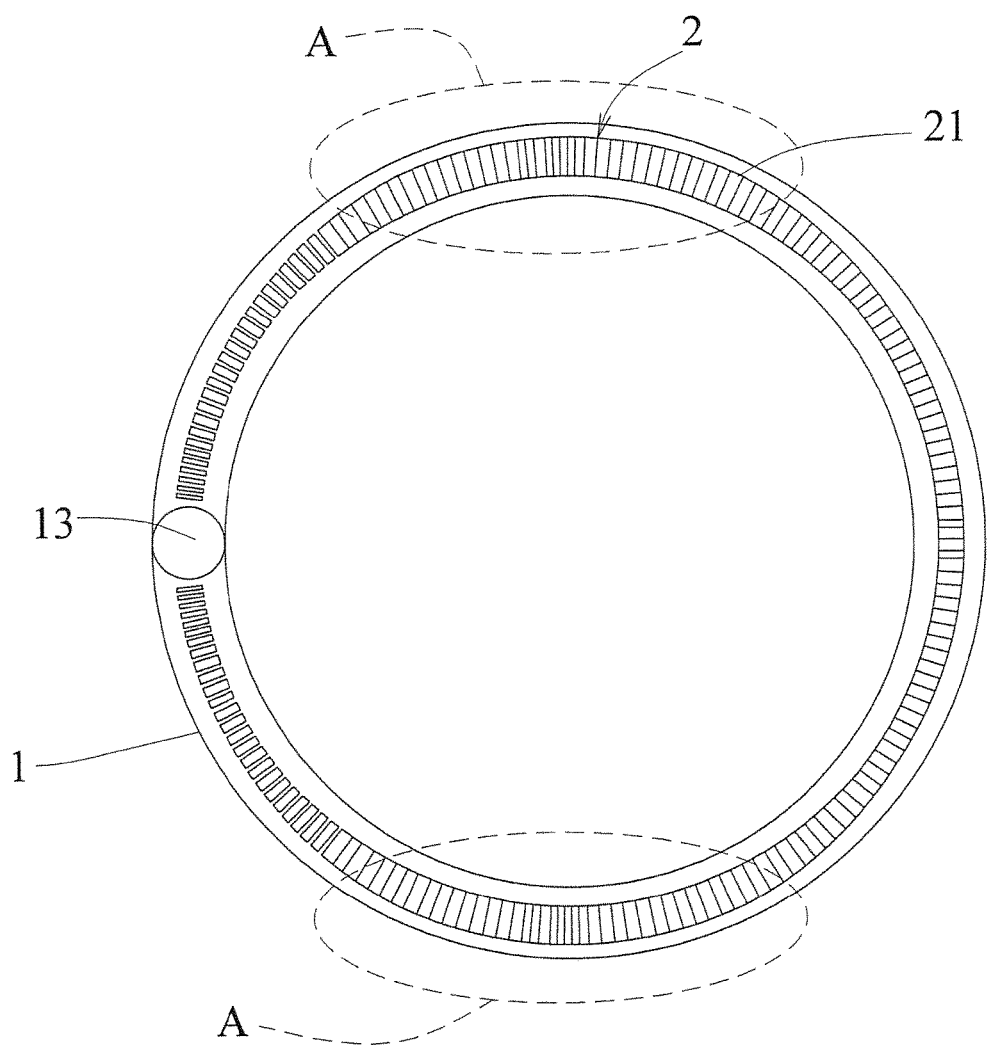
FIG. 2 is a top view of an improved light ring structure for vehicle lamp according to another embodiment of the present invention.
Figure 3:
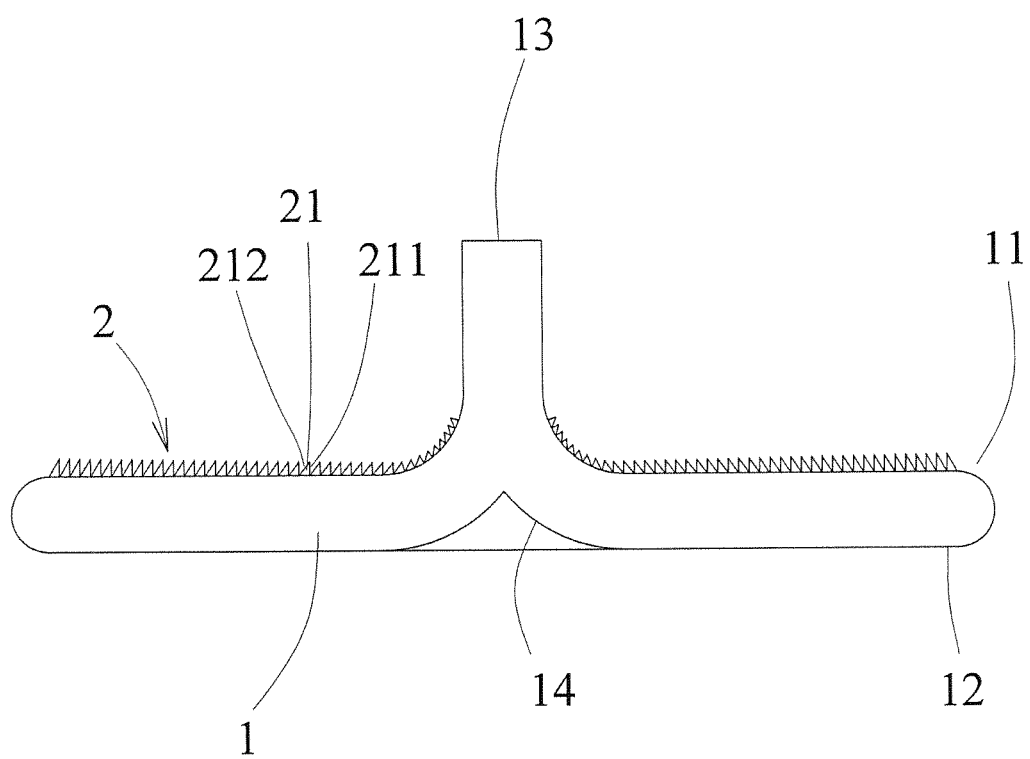
FIG. 3 is a front view of an improved light ring structure for vehicle lamp according to another embodiment of the present invention.
Figure 4:
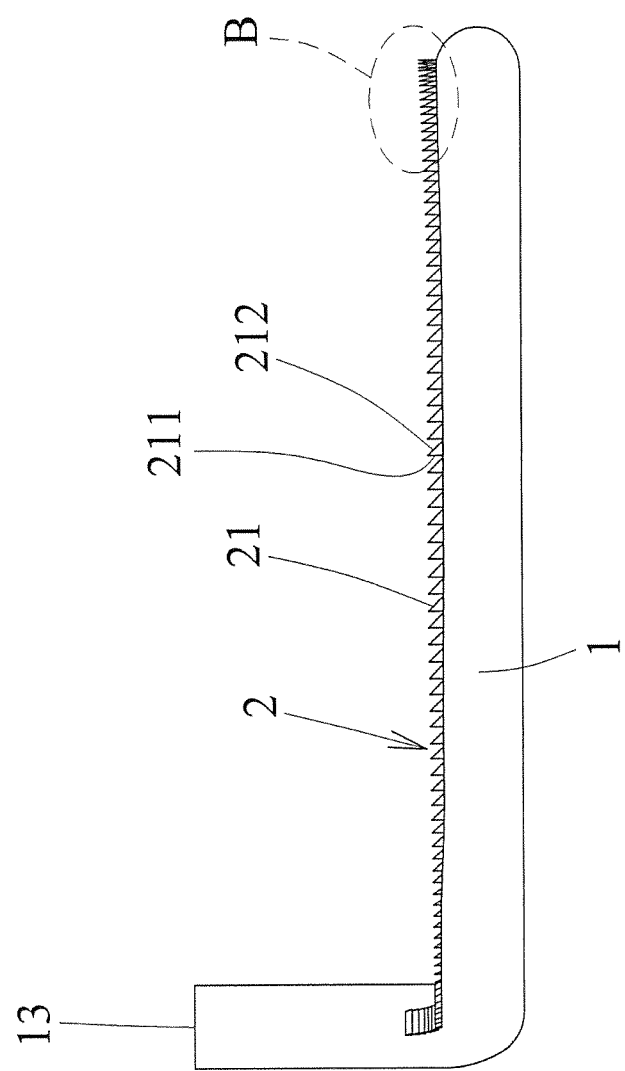
FIG. 4 is a side view of an improved light ring structure for vehicle lamp according to another embodiment of the present invention.

FIG. 1 is a three-dimensional view of an improved light ring structure for vehicle lamp according to an embodiment of the present invention. FIG. 2 is a top view of an improved light ring structure for vehicle lamp according to another embodiment of the present invention. FIG. 3 is a front view of an improved light ring structure for vehicle lamp according to another embodiment of the present invention. FIG. 4 is an improved side view of a light ring structure for vehicle lamp according to another embodiment of the present invention. An improved light ring structure for vehicle lamp of the present invention comprises a light-guiding ring 1, an incident portion 13, a V-shaped light-guiding portion 14 and an optical structure 2.

The light-guiding ring 1 has a first surface as an optical surface 11 and a second surface as a light-emitting surface 12. The incident portion 13 is extended and projected from the optical surface 11 of the light-guiding ring 1. The V-shaped light-guiding portion 14 connects the incident portion 13 and the light-emitting surface 12 of the light-guiding ring 1. Therefore, the light entering from the incident portion 13 is guided bilaterally into the light-guiding ring 1 through the V-shaped light-guiding portion 14 and refracted by the optical structure 2 to emit from the light-emitting surface 12 of the light-guiding ring 1.

The optical structure 2 is formed by several teeth 21 which are aligned on the optical surface 11 of the light-guiding ring 1. One side of each tooth 21 is a vertical section 211 which faces to the incident portion 13 of the light-guiding ring 1 and the other side of that is an inclined section 212. The width of the teeth 21 is increased gradually across the plurality of teeth from the incident portion 13 of the light-guiding ring 1 to the two side portions A of the light-guiding ring 1, forming the widest points in the optical structure 2 that is, the widest teeth 21) at the two side portions A of the light-guiding ring 1, the side portions shown as the two circles A in FIG. 2, and then the width of the teeth 21 is decreased gradually to the portion B of the optical surface opposite of the incident portion 13 of the light-guiding ring 1. Furthermore, the height of the teeth 21 is increased gradually from the incident portion 13, forming the highest tooth 21 at the portion B of the optical surface opposite of the incident portion 13, shown as the circle B in FIG. 4.

Figure 5:
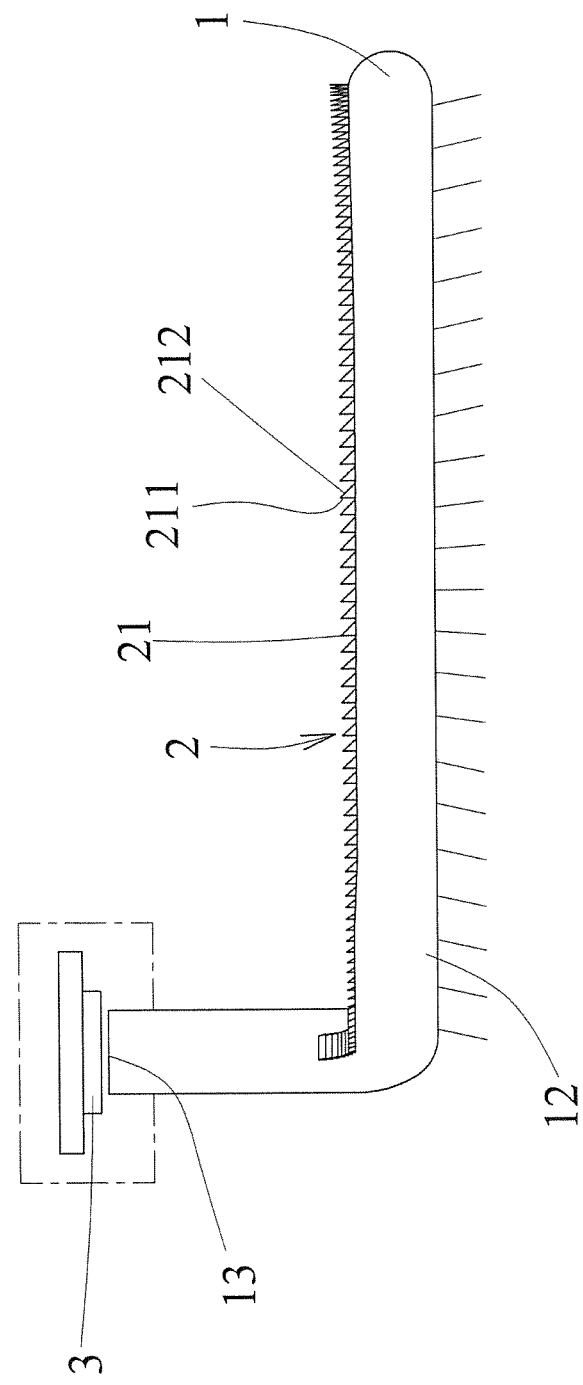
FIG. 5 is a side view of an improved light ring structure for vehicle lamp when used according to another embodiment of the present invention.

Please refer to FIG. 5, which is a side view of an improved light ring structure for vehicle lamp when used according to another embodiment of the present invention. A light source 3 is set to correspond with the incident portion 13 of the light-guiding ring 1. The light emitted by the light source 3 illuminates toward the incident portion 13 of the light-guiding ring 1, then the light entering from the incident portion 13 is guided into the bilateral of the light-guiding ring 1 through the V-shaped light-guiding portion 14. After the light enters the light-guiding ring 1, the light is refracted by the teeth 21 of the optical structure 2 on the optical surface 11 of the light-guiding ring 1. Since the vertical section 211 of the teeth 21 is aligned to face to the incident portion 13, the height of the teeth 21 is increased gradually from the incident portion 13, and the width of the teeth 21 is increased gradually from the incident portion 13 to the two side portions A of the light-guiding ring 1, the light transmission is passed the each tooth 21 one by one, and then the light is emitted from the light-emitting surface 12 of the light-guiding ring. Therefore, the other drivers or the pedestrian see the vehicle clearly due to the light emitting from the light-emitting surface of the light-guiding ring, achieving eye-catching caution and recognition.

According to the above description and embodiments, the improved light ring structure for vehicle lamp of the present invention has the advantages as following:

1. In the improved light ring structure for vehicle lamp of the present invention, the optical surface of the light-guiding ring comprises the optical structure. Since the vertical section of the teeth faces to the incident portion, the height of the teeth is increased gradually from the incident portion, and the width of the teeth is increased gradually from the incident portion and the opposite of the incident portion to the two sides of the light-guiding ring, the light emitted from the light source is guided to the optical structure for refraction, thereby emitting light with high brightness and uniform color from the light-emitting surface.

2. In the improved light ring structure for vehicle lamp of the present invention, the incident portion is extended and projected from the optical surface of the light-guiding ring, so the light emitting by only one led as the light source has high brightness and uniform color at the entire light-guiding ring, achieving the energy-saving effect and lower cost.

3. The light-guiding ring of the present invention is integrated, and the incident portion is extended and projected from one end of the optical surface of the light-guiding ring, so the light distribution pattern is a complete circle without notch.

The foregoing embodiments and drawings does not limits the product structures or uses of the present invention, it will be obvious to those skilled in the art that various modifications may be made without departing from the spirit and the scope of the present invention.

What is claimed is:

1. An improved light ring structure for a vehicle lamp, comprising:
   a light-guiding ring, having a first surface as an optical surface and a second surface as a light-emitting surface;
   an incident portion, extended and projected from the optical surface;
   a V-shaped light-guiding portion, connecting the incident portion and the light-guiding ring; and
   an optical structure, formed on the optical surface, the optical structure including a plurality of teeth aligned on the optical surface of the light-guiding ring,
   wherein one side of each tooth is a vertical section which faces to the incident portion of the light-guiding ring and the other side of each tooth is an inclined section,
   wherein a width of the teeth is increased gradually from the incident portion and from a portion of the optical surface opposite of the incident portion to two side portions of the light-guiding ring to thereby respectively form two widest teeth of the plurality of teeth at the two side portions of the light-guiding ring, and
   wherein a height of the teeth is increased gradually across the plurality of teeth from the incident portion, forming a highest tooth of the plurality of teeth at the portion of the optical surface opposite of the incident portion of the light-guiding ring.

2. The improved light ring structure of claim 1, wherein the vertical section of each tooth is at a right angle to the optical surface.

3. The improved light ring structure of claim 1, wherein the incident portion and the V-shaped light-guiding portion are integrally formed with the light-guiding ring.

* * * * *